May 18, 1937. D. J. STEWART 2,080,444
TEMPERATURE REGULATING SYSTEM
Filed Oct. 4, 1934
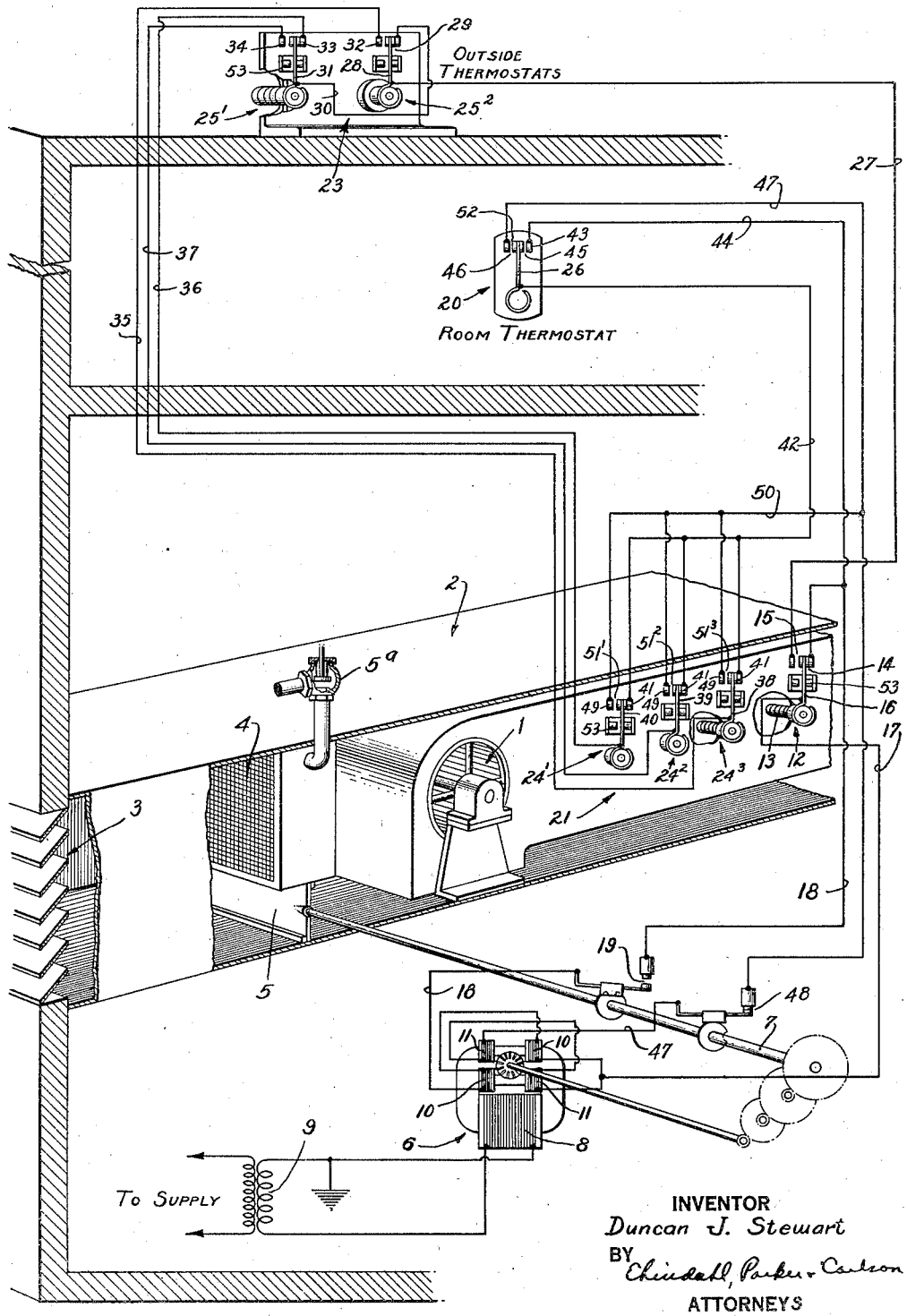
INVENTOR
Duncan J. Stewart
BY
Tindall, Parker & Carlson
ATTORNEYS Patented May 18, 1937

2,080,444

UNITED STATES PATENT OFFICE 2,080,444

TEMPERATURE REGULATING SYSTEM

Duncan J. Stewart, Rockford, Ill., assignor to Howard D. Colman, Rockford, Ill.

Application October 4, 1934, Serial No. 746,799

4 Claims. (Cl. 236—91)

This invention relates generally to temperature control systems and more particularly to those for air conditioning systems of the so-called blast type wherein a current of conditioned air is circulated into the space the temperature of which is to be controlled.

The general object of the invention is to provide a control of the above character for effecting accurate regulation of temperature in spite of varying weather conditions while at the same time establishing one limit temperature of the conditioning medium which remains fixed regardless of changes in the temperature outside the building.

A more detailed object is to provide a novel control for air conditioning systems of the blast type wherein the temperature of the conditioning medium is governed by two independent limit thermostats one of which is superior in its control to that of the controlling room thermostat while the other is adjusted automatically in accordance with outside temperature changes.

Other objects and advantages of the invention will become apparent from the following detailed description taken in connection with the accompanying drawing which is a schematic view and wiring diagram of a so-called blast heating system arranged to be controlled in accordance with the present invention. In such systems, fresh air is drawn by a power driven blower 1 into a duct 2 through an inlet 3 and, after being tempered by a heater 4, is distributed by suitable means (not shown) to the different parts of the building the temperature of which is to be controlled. Herein, the heater is in the form of a radiator supplied with heating fluid such as steam through a control valve $5^a$ and partially filling the duct 2 so that the amount of heat imparted to the air passing through the duct may be varied by changing the position of a regulator in the form of a damper 5 controlling the by-passage around the heater.

In the present instance, the damper is actuated by a power operator comprising a reversible electric motor 6 the shaft of which is geared to the damper actuating shaft 7. The motor shown is of the induction type having a winding 8 constantly energized from an alternating current source 9 and two sets 10 and 11 of shading coils adapted to be short-circuited selectively to control the starting and direction of rotation of the motor shaft. The arrangement is such that when the coils 11 are short-circuited, the motor will run in a clockwise direction and move the damper to open the by-pass and thereby decrease the rate of heat delivery to the air current. When the coils 10 are short-circuited, the damper moves toward the closed position shown in which the effectiveness of the heater 4 is a maximum.

In order to avoid the introduction of cold air into the space being heated, provision is made for limiting the minimum temperature of the heated air to a predetermined value which is maintained fixed regardless of changes in the outside temperature. To this end, a thermostat 12 is mounted with its element 13 arranged to respond to temperatures in the duct 2 beyond the heater and set to detect variations in the duct temperature. A fall in temperature below the control point of the thermostat is evidenced by closure of a switch 14 while a higher duct temperature will effect closure of the switch 15.

To utilize the thermostat 12 in controlling the motor 6, the tongue 16 of the thermostat is connected by a conductor 17 to the common terminal of the shading coils 10 and 11 each set of which are connected in series relation. The insulated terminal of the coils 10 is joined by a conductor 18 to the switch 14 so that when the latter is closed, the coils 10 will be short-circuited and the motor will run in a direction to close the damper and increase the duct temperature until the maximum capacity of the heater is attained whereupon a limit switch 19 in the conductor 18 will be opened by a cam on the damper shaft 7.

When the duct temperature is above the minimum established in the manner above described, the control of the motor is transferred to a thermostat 20 disposed in the space to be heated and operating in conjunction with thermostatic means 21 for limiting the maximum temperature to which the air discharged into the space may be heated. Thermostatic means 23 is also provided for varying the maximum duct temperature inversely with changes in the temperature outside of the building.

In the present instance, the thermostatic means 21 operates with a progressive step-by-step action and takes the form of a plurality of independent thermostats $24^1$, $24^2$ and $24^3$ set to respond to progressively increasing control points and having their thermostatic elements disposed within the duct 2 beyond the heater 4. The outdoor thermostatic means 23 also comprises a plurality of thermostats $25^1$ and $25^2$ set to respond to different outdoor temperatures.

To place the motor 6 under the control of the room thermostat when the temperature of the duct is above the established minimum value as determined by the condition of the thermostat 12, conductors are extended from the switch 15 to the tongue 26 of the room thermostat through one or both of the outdoor thermostats 25 and through one of the maximum limit thermostats 24. For this purpose, the stationary contact of the switch 15 is joined by a conductor 27 to the tongue 28 of the outdoor thermostat $25^2$. The switch contact 29 of this thermostat is connected by a conductor 30 to the tongue 31 of the thermostat $25^1$. The contacts 32, 33 and 34 of the thermostats 25 and $25^2$ are respectively connected by conductors 35, 36 and 37 to the tongues 38, 39 and 40 of the thermostats $24^3$, $24^2$ and $24^1$.

The contacts 41 of the thermostats 24, which are engaged by the tongues 38, 39 and 40 when a temperature lower than the control points of the respective thermostats prevails in the duct, are joined to a common conductor 42 leading to the tongue 26 of the room thermostat. One contact 43 of the latter is joined by a conductor 44 to the conductor 18 so that the closed-when-cold switch 45 is in parallel with the low limit control switch 14. The other contact 46 of the room thermostat is connected to the windings 11 by a conductor 47 which has interposed therein a limit switch 48 which is opened when the damper reaches open position. The contacts 49 of the duct thermostats 24 which are engaged by the tongues 38, 39 and 40 when the duct temperature is above the control points of the respective thermostats, are connected to a conductor 50 joined to the conductor 47 so that the switches $51^1$, $51^2$ and $51^3$ are in parallel with the closed-when-hot switch 52 of the room thermostat. As a result of this arrangement, movement of the damper toward open position may be caused by closure of the switch 52 or by closure of a switch 51 of the duct thermostat then in active control as determined by the outside temperature.

Preferably, all of the thermostats with the exception of the room thermostats are of the detent type, that is, equipped with means for maintaining either one or the other of their control switches closed at all times. For this purpose, the thermostats may be equipped with a magnet 53 having poles disposed on opposite sides of the thermostat tongue which constitutes the magnet armature.

To illustrate the operation of the control, let it be assumed that the control point of the room thermostat is 70 degrees, that of the thermostats $25^1$ and $25^2$ 10 and 40 degrees respectively, that of the thermostats $24^1$, $24^2$ and $24^3$ 130, 110 and 90 degrees respectively, and that of the thermostat 12 65 degrees. If, for example, the outdoor temperature is below 10 degrees, the switch 31, 33 of the thermostat $25^1$ would be closed thereby placing the duct thermostat $24^1$ in active control.

Now assume that the damper is in its limit closed position as shown in the drawing due to a fall in the duct temperature below 65 degrees. The heater will operate at full capacity and continue so long as the switch 14 remains closed. When the duct temperature has been increased above 65 degrees, the switch 14 will be opened and the switch 15 closed thereby transferring the control of the motor 6 to the room thermostat. If at this time the room thermostat is calling for heat as evidenced by closure of the switch 45, the damper will remain closed and the heater will continue to raise the duct temperature. When the requirements of the room have been satisfied as indicated by closure of the switch 52, a circuit for energizing the motor windings 11 is established through the conductor 17, the closed switch 15, conductor 27, switch 28, 29, conductor 30, switch 31, 33, conductor 36, switch 40, 41 of the duct thermostat $24^1$, conductor 42, room thermostat switch 52, conductor 47 to the insulated terminal of the windings 11. The motor is started in a direction to open the damper and decrease the effectiveness of the heater 4. Opening of the damper continues until the room or low limit thermostat calls for heat. If the room thermostat switch 45 becomes closed, the conductor 42 is extended to the motor windings 10 through the conductors 44 and 18, thereby reversing the direction of rotation of the motor to initiate closure of the damper.

Assuming now that the duct temperature rises above 130 degrees before the damper becomes fully closed. This condition would be evidenced by closure of the switch $51^1$ whereupon the conductor 36 would be connected to the conductor 47 and a circuit for energizing the windings 11 independently of the room thermostat would be established thereby initiating movement of the damper toward open position. Such movement will continue until the duct temperature has been reduced below 130 degrees.

In the event that the outside temperature rises above 10 degrees, the switch 31, 34 of the thermostat 25 would be closed thereby rendering the duct thermostat $24^1$ ineffectual and placing the thermostat $24^2$ in active control. Thereafter, movement of the damper toward closed position would be limited by a rise in the duct temperature above 110 degrees. In a similar way, the duct thermostat $24^3$ would be placed in control by closure of the switch 28, 32 when the outside temperature is above 40 degrees.

From the foregoing, it will be apparent that the low and high limit duct thermostats operate independently of each other so that a fixed low limit temperature is always maintained in the duct regardless of changes in the outside temperature. The control of the thermostat 12 is superior to the other thermostats, that is to say, the thermostat 12 will operate to increase the rate of heat delivery regardless of the condition of the room and maximum limit thermostats whenever the duct temperature falls below the desired minimum. Thus, by opening of its switch 15, the low limit thermostat operates to render the room and high limit thermostat ineffective until the duct temperature has again been raised above the minimum limit. As a result of this arrangement, the control is conditioned automatically for maintaining an accurate room temperature under varying outdoor temperatures while at the same time maintaining a fixed low limit temperature of the heating medium.

I claim as my invention:

1. A blast heating system having means for circulating air to a space to be heated, a heater arranged to supply heat to the air, a regulating device controlling the operation of said heater, a thermostat responsive to temperature changes in said space and arranged to govern the operation of said device to increase and decrease the supply of heat by said heater, thermostatic means responsive to temperature changes of the air adjacent said heater and operating independently of said thermostat to control said device and limit the temperature to which the air may be heated by said heater in response to the call of the room thermostat for heat, means responsive to temperature changes in the air delivered to said heater and operating to vary the temperature at which said thermostatic means effects its control, and a thermostat having an independently operable thermostatic element responsive to changes in the temperature of the heated air adjacent said heater, said last mentioned thermostat acting in response to a fall in temperature below a predetermined value to withdraw said space thermostat from the control of said device and cause operation of the latter to increase the rate of heat supply to the air.

2. A system for conditioning the air within a building having, in combination, means for circulating a current of air into the space to be conditioned, a conditioning device arranged in heat-exchanging relation to said air current, a regulator controlling said device, a thermostat in said space normally controlling said regulator to maintain a uniform temperature in the space, thermostatic means having a thermostatic element responsive to temperature changes of the air adjacent said device and acting to limit the temperature to which the air may be changed under the control of said thermostat, means responsive to temperature changes outside of said building for varying the temperature to which said thermostatic means is adapted to respond, an independently operable thermostatic member responsive to the temperature of the conditioned air, means operating upon movement of said member in one direction to place said thermostat and thermostatic means in control of said regulator, said means acting upon movement of the member in the opposite direction to withdraw said regulator from the control of the thermostat and thermostatic means and place the regulator within the exclusive control of the member.

3. An air conditioning system having, in combination, means for circulating a current of air to the space to be conditioned, a conditioning device arranged in heat-exchanging relation to said air current, a regulator controlling said device, thermostatic means responsive to the temperature of the conditioned air and normally controlling the operation of said regulator, means responsive to changes in the condition of the air delivered to said device to vary the controlling action of said thermostatic means, a thermostat having a thermostatic element responsive to the temperature of the conditioned air before delivery to said space and independently of said thermostatic means and having a control member movable in opposite directions into two different control positions, and means operated by movement of said member into one of said positions to cause movement of said regulator in a direction to produce a reverse change in the temperature of the conditioned air independently of the prevailing condition of said thermostatic means.

4. An air conditioning system having, in combination, a duct through which a current of air may be circulated into a space to be heated, a heater arranged in heat-exchanging relation to said air current, a regulator controlling said heater, two independently operable thermostatic means each responsive to temperature changes of the air before delivery to said space and respectively controlling said regulator to maintain the temperature of the heated air within a range defined by upper and lower temperature limits, means arranged to detect changes in the temperature of the air delivered to said heater to vary the control point of the one of said thermostatic means establishing said upper limit temperature, and an independent thermostat responsive to temperature changes in said space and operating when the temperature of the delivered air is between said upper and lower limits to vary the temperature of the delivered air in accordance with the heat requirements in said space.

DUNCAN J. STEWART.